UNITED STATES PATENT OFFICE.

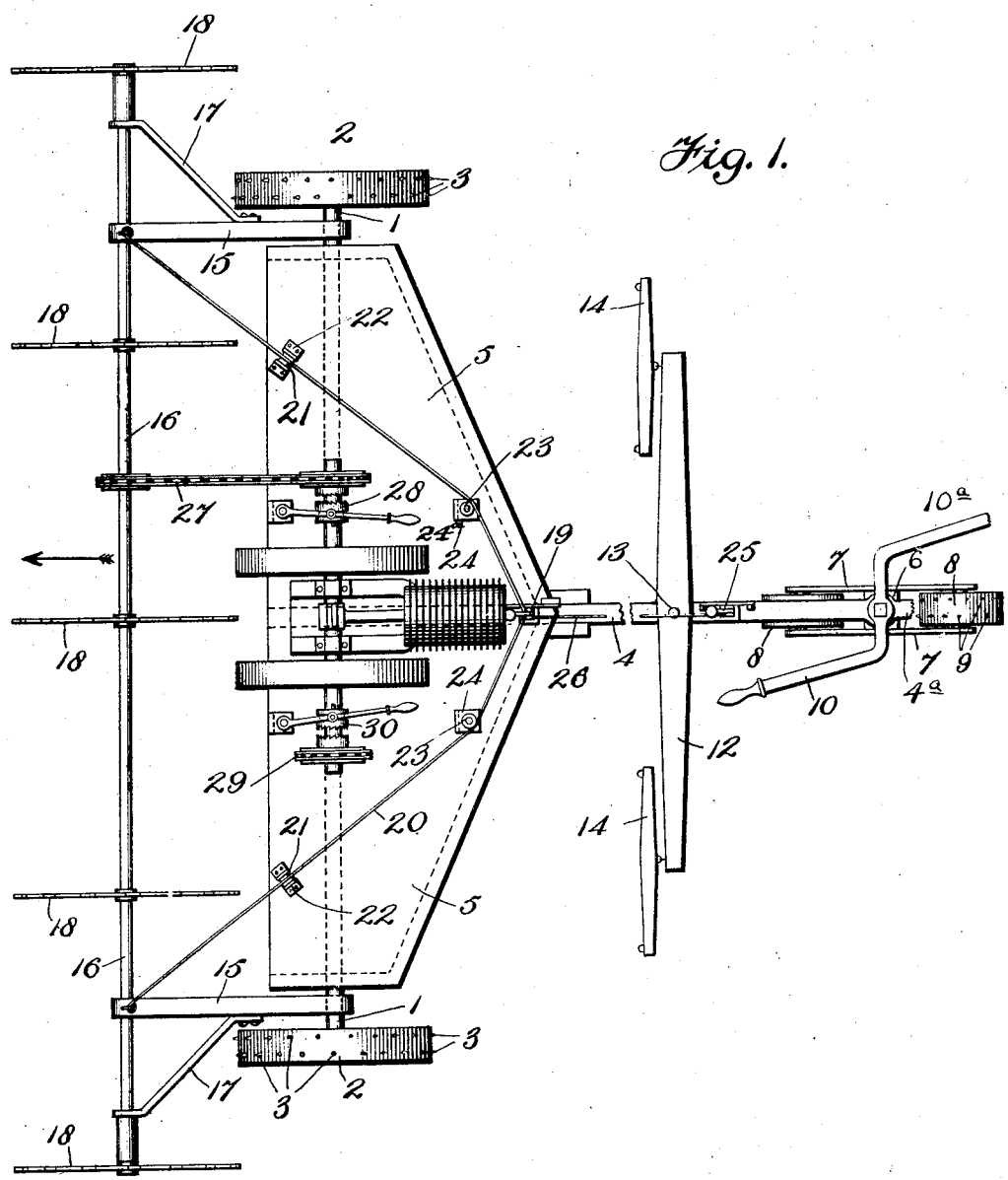

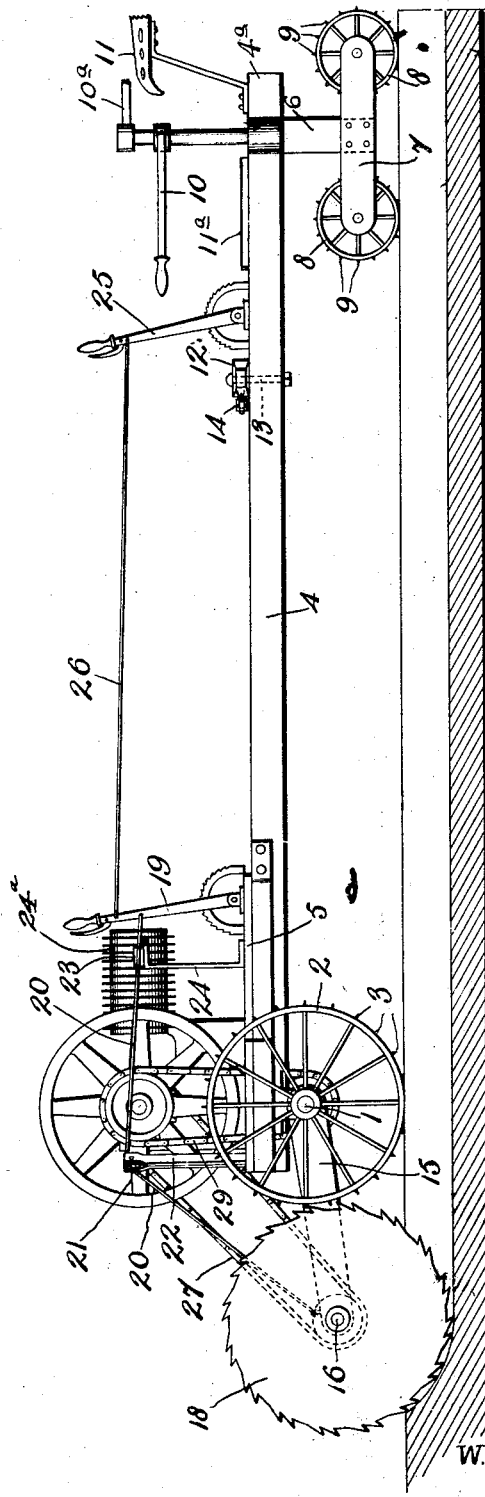

WILLIAM C. WILLIAMS, OF BURWELL, NEBRASKA.

ICE-CUTTING MACHINE.

1,087,476.  Specification of Letters Patent.  Patented Feb. 17, 1914.

Application filed April 24, 1913. Serial No. 763,474.

*To all whom it may concern:*

Be it known that I, WILLIAM C. WILLIAMS, citizen of the United States, residing at Burwell, in the county of Garfield and State of Nebraska, have invented certain new and useful Improvements in Ice-Cutting Machines, of which the following is a specification.

The present invention relates to certain new and useful improvements in ice cutting machines, and has for its object to provide a device of this character which embodies novel features of construction whereby large quantities of ice may be easily and quickly cut.

Further objects of the invention are to provide a cutting machine which is simple and inexpensive in its construction, which is under the complete control of the operator, and which may be adjusted to cut the ice to any required depth.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of an ice cutting machine constructed in accordance with the invention, portions being broken away. Fig. 2 is a side elevation of the same.

Corresponding and like parts are referred to in the following description and indicated in all the views of the drawings by the same reference characters.

Specifically describing the present embodiment of the invention, the numeral 1 designates the main axle which is arranged at the forward end of the machine and has the supporting wheels 2 rigidly secured to the ends thereof, the said wheels being provided with the peripheral teeth or spikes 3 so as to travel over the ice without danger of slipping. A reach 4 extends rearwardly from the middle portion of the axle, and a platform 5 is mounted upon the axle 1 and forward end of the reach. The rear end of the reach 4 is pivotally connected to a standard 6, the said standard being provided at the lower end thereof with a longitudinally extending and horizontally disposed bar 7 upon the ends of which the guide wheels 8 are mounted. These guide wheels are also provided with the peripheral teeth or spikes 9 so that they will travel readily over the ice without danger of slipping. The upper end of the standard 6 is provided with a forwardly extending handle 10 and a rearwardly extending handle 10$^a$. The handle 10 may be readily grasped by an operator standing upon a platform 11$^a$ (see Fig. 2) arranged at the rear end of the reach 4 in front of the standard 6, while the rearwardly extending handle 10$^a$ may be readily grasped by an operator upon the seat 11 which is mounted upon the portion 4$^a$ of the reach 4 extending rearwardly of the standard 6. It will thus be obvious that the device may be readily controlled by an operator standing upon the platform 11$^a$ or seated upon the seat 11. A double-tree 12 is pivotally mounted at 13 upon the rear portion of the reach 4, the ends of the double-tree having the swingle-trees 14 applied thereto. Horses or other draft animals may be connected to the swingle-trees 14 for the purpose of propelling the ice plow over the surface of the ice, one of the draft animals being located upon each side of the reach 4.

A pair of forwardly extending arms 15 are pivotally mounted upon the main axle 1 at each end of the platform 5, the forward ends of the arms being provided with suitable bearings within which the saw shaft 16 is journaled. This saw shaft projects laterally beyond the sides of the main frame and is arranged parallel to the axle 1, each of the arms 15 carrying an auxiliary bearing member 17 for engaging the projecting ends of the saw shaft. These auxiliary bearing members 17 preferably engage the end saws 18 so as to hold the saw shaft against longitudinal movement within the bearings. The saws 18 are properly spaced upon the saw shaft 16 so as to cut channels in the ice at the requisite distance apart.

A lever 19 is mounted upon the rear portion of the platform 5 at the middle thereof, the said lever being connected to the forwardly diverging cables 20 which have the extremities thereof connected to the saw carrying arms 15. These cables 20 pass upwardly and over guide pulleys 21 upon standards 22 at the forward edge of the platform 5 and also around horizontally disposed pulleys 23 upon standards 24 arranged upon each side of the engine 24$^a$. A second lever 25 is mounted upon the rear end of the reach 4 immediately in front of the seat 11, the said second lever being connected to the first lever 19 by means of a suitable tie-member or rod 26. When the operator is upon the platform 5, the arms 15 can be swung upwardly and the saws 18 lifted by pulling rearwardly upon the lever 19. However, should the operator be sitting upon the seat 11, the same result would be accomplished by pulling rearwardly upon the second lever 25.

An engine 24 is mounted upon the platform 5 and is employed for driving the saws. One end of the engine shaft has a chain and sprocket connection 27 with the saw shaft 16, a suitable clutch 28 being provided for throwing the saws into and out of operation. When this clutch 28 is closed and the engine is running the saws will be driven so as to cut channels in the ice as the machine is advanced over the surface thereof, while when the clutch 28 is open the engine will run independently of the saws.

It is contemplated to propel the machine over the ice by the use of draft animals, although it may at times be desirable to use the engine for this purpose, particularly when the saws are not in operation and it is merely desired to move the machine from place to place. The opposite end of the engine shaft is accordingly shown as having a chain and sprocket connection 29 with the main axle 1, a clutch 30 being provided for throwing this connection into operation.

Having thus described the invention, what I claim as new and desire to secure by Letters Patent, is:—

1. An ice cutting machine including a transversely disposed main axle, supporting wheels at opposite ends of the main axle, a reach extending rearwardly from the said axle, a platform at the intersection of the reach and main axle, a vertical standard pivotally connected to the rear end of the reach, guide wheels at the lower end of the standard, a double tree applied to the rear end of the reach, swinging arms extending forwardly from the main axle and pivotally connected thereto, a transversely disposed saw shaft journaled upon the swinging arms and arranged in advance of the main axle, saws upon the saw shaft, an engine upon the before mentioned platform, an operative connection between the engine and the saw shaft, and means for raising and lowering the saw shaft.

2. An ice cutting machine including a transversely disposed main axle, supporting wheels at opposite ends of the main axle, a reach extending rearwardly from the main axle, a platform at the intersection of the reach and main axle, a vertical standard pivotally connected to the rear end of the reach, guide wheels at the lower end of the vertical standard, a double tree applied to the rear end of the reach, swinging arms projecting forwardly from the main axle and pivotally connected to opposite ends thereof, a transverse saw shaft journaled upon the swinging arms and arranged in advance of the axle, saws upon the saw shaft, an engine mounted upon the platform, an operative connection between the engine and the saw shaft, a main controlling lever mounted upon the rear end of the reach, a second controlling lever mounted upon the platform, an operative connection between the two levers, a pair of cables connecting the second lever to opposite ends of the saw shaft, and guide pulleys engaging the cables so that the saw shaft can be raised and lowered through the medium of the two levers.

In testimony whereof I affix my signature in presence of two witnesses.

WILLIAM C. WILLIAMS.

Witnesses:
F. A. JOHNSON,
FLOY HARTFORD.